UNITED STATES PATENT OFFICE.

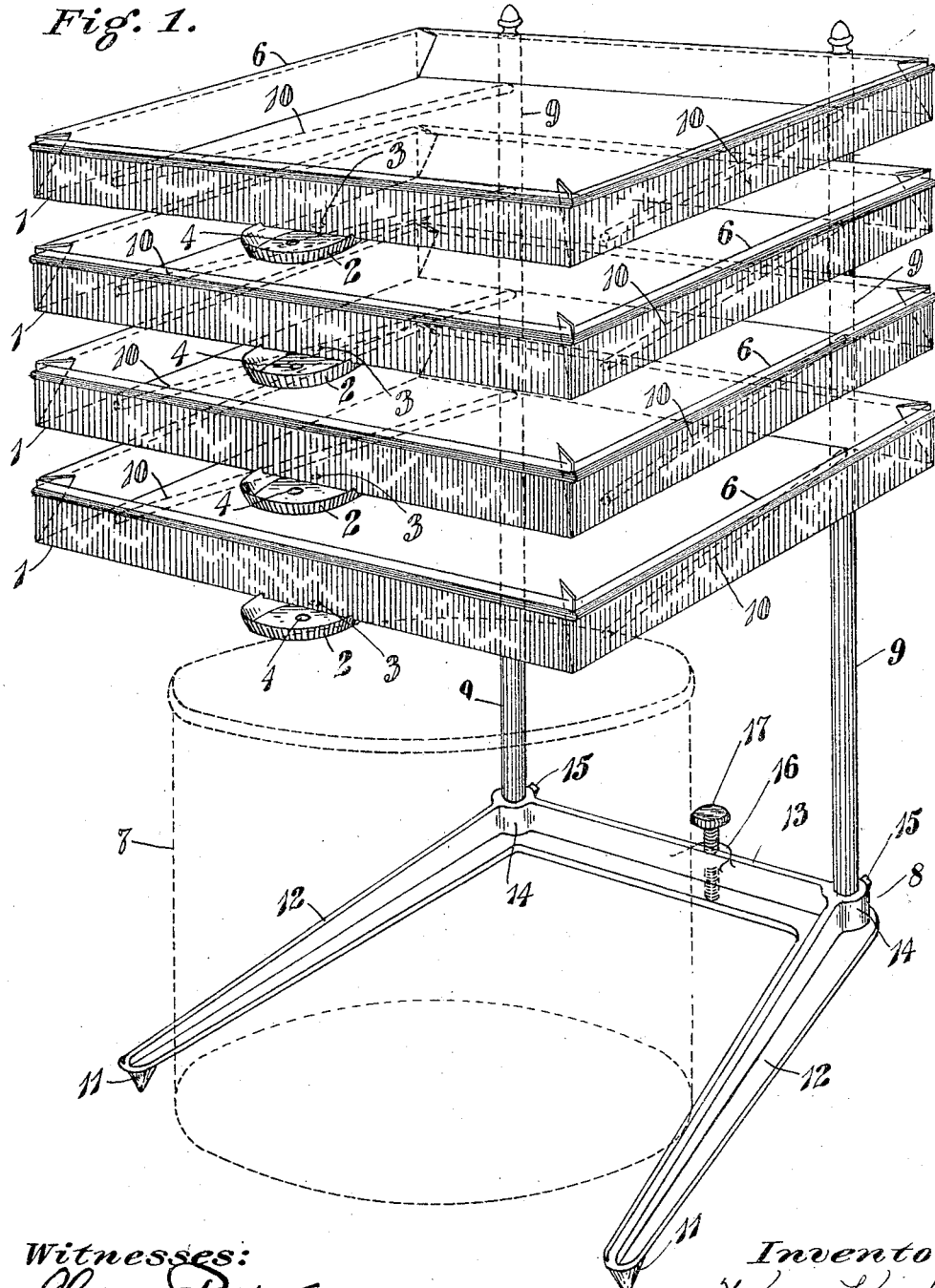

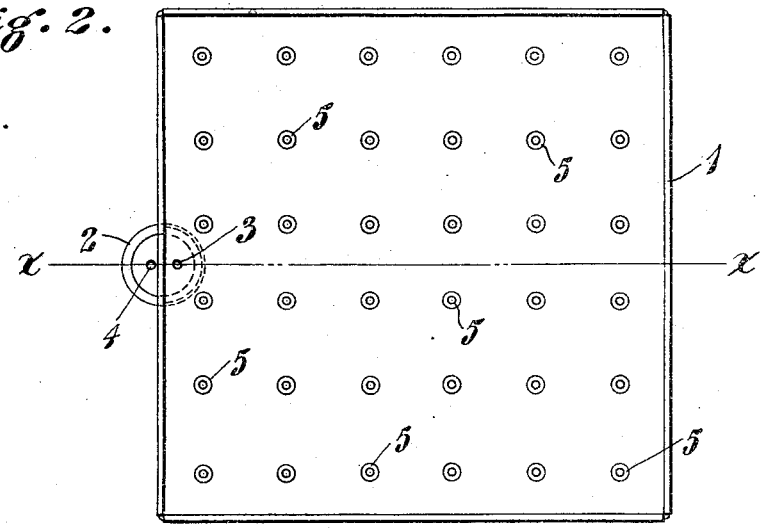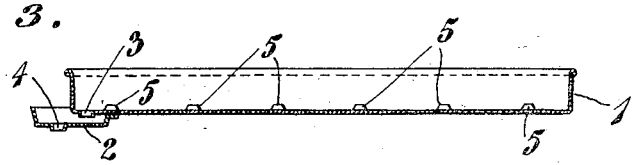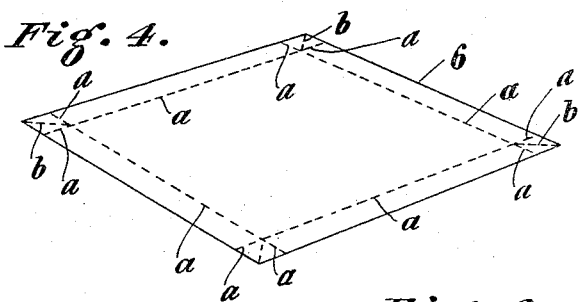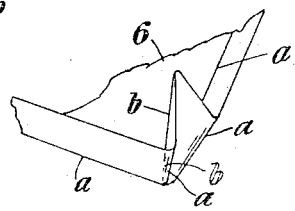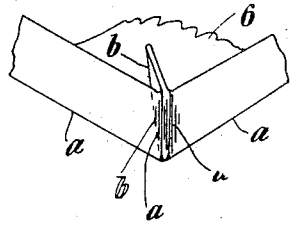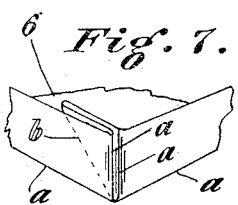

KARL KIEFER, OF CINCINNATI, OHIO.

FILTERING APPARATUS.

1,211,947.  Specification of Letters Patent.  Patented Jan. 9, 1917.

Application filed April 8, 1913. Serial No. 759,821.

*To all whom it may concern:*

Be it known that I, KARL KIEFER, a citizen of the United States, residing at Cincinnati, in the county of Hamilton and State of Ohio, have invented certain new and useful Improvements in Filtering Apparatus, of which the following is a specification.

My invention relates to filters, and its object is to purify liquids without clogging the filtering medium.

My invention consists in the apparatus, the details of which will be hereinafter more fully described and claimed.

My invention is especially useful in purifying lubricating oils that have been used in internal-combustion engines, where the oil becomes impregnated with carbon and products of combustion, as well as with substances resulting from the wear of the machine parts, all of which have a strong tendency to clog the filtering medium.

In the drawings: Figure 1 is a general perspective view of apparatus as I prefer to construct it in carrying out my process; the vessel for receiving the filtered liquid being merely represented by dotted lines, to avoid obscuring other details of the device. Fig. 2 is a plan view of one of the trays or pans. Fig. 3 is a section on the line $x$—$x$ of Fig. 2. Fig. 4 is a detail perspective view of the filtering sheet, with dotted lines indicating the lines of folding the sheet in carrying out the process. Fig. 5 is a perspective view illustrating a succeeding step in the folding of the sheet. Fig. 6 illustrates the sheet completely folded to enter the tray or pan. Fig. 7 illustrates how the sheet is folded if it be desired to secure it, so that it is self-supporting without insertion into the tray or pan, as will be more fully described.

The apparatus, as illustrated, comprises the rectangular trays or pans 1, of shallow formation. Each pan has a spout 2 near the middle of its front side, being a small shallow cup with half its area extending under the bottom of the pan and soldered by its edge to said bottom. The bottom of the pan has an orifice 3 over the part of the cup extending thereunder, and the cup has an orifice 4 in its bottom. The bottom of the pan has a series of protuberances 5 embossed upward in its bottom, which serve to separate the filtering sheet 6 from the bottom and thereby leave universal liquid ways between the sheet and the bottom of the pan, to allow the liquid, after passing through the sheet, to travel to the orifice 3, and through it into the cup or spout 2, from which the liquid flows through the orifice 4 in the spout. These rectangular pans or trays 1, thus constructed, are arranged in vertical series, with their spouts in vertical alinement, so that each spout receives the liquid flowing from one above, and the lowermost spout discharges all the liquid into the vessel 7, placed below the trays. To hold these trays in such arrangement, a stand comprising the base 8 with vertical standards 9 is provided. Arms 10 are mounted in the standards, upon which the trays rest. The base 8 has two forward feet 11, near the forward ends of side members 12, which members extend back to and are joined by a rear member 13. It is near the junction of the side members with this rear member that the standards 9 are supported in the base, being inserted in hubs 14 of the base and clamped therein by set-screws 15. The rear member has a hub or boss 16 near its middle, extending rearwardly, and an adjusting screw 17 passes vertically through the hub, with its point forming the third foot of the base. By screwing this screw downward, the entire apparatus may be tilted forward, so that the inclination of the trays may be accurately adjusted, to regulate the flow of filtered liquid toward the front of the trays.

It will be understood that any number of trays may be arranged as above described; also that only one tray may be advantageously employed in some instances, depending upon the capacity desired. The device as illustrated, with four trays about one foot square and about one inch deep, will be of ample capacity to supply purified oil for one motor vehicle or similar apparatus. The small cups or spouts 2 on the trays also serve as handles for pulling the trays out from their supports for filling with liquid, or for removing and replacing filtering sheets after they have become unfit for further use. With filtering sheets of paper of the proper quality and texture, several times the capacity of a tray may be filtered, so that it is permissible to refill the trays several times before renewing the filtering sheets.

With the apparatus above described, a rectangular sheet of filtering material, for which certain kinds of porous paper are most suitable, is folded as indicated in Figs. 4 to 7, inclusive. Thus, the sheet 6, Fig. 4, is provided of such size that when its parts near its edges are folded up on the lines $a$ to leave the flat bottom part of the sheet conforming snugly in the bottom of the tray 1, the edge portions, now forming the sides, will preferably extend slightly above the edges of the sides of the tray. This obviates flow of unfiltered liquid over the upper edges of the sheet when the tray is filled close to its full capacity. This relation of the sheet to the tray is readily observed in the general view in Fig. 1. To enable the superfluous corner portions of the sheet to be disposed of without cutting the sheet, they are folded diagonally along the lines $b$, Fig. 4, which allows them to buckle inward when the edge parts of the sheet are brought up, as seen in Fig. 5, and permitting these edge portions to assume a full vertical position, as in Fig. 6. If it be desired to secure the sheets so that they will retain this formation without the support of the trays, the part that buckled inward may be brought over against one of the vertical sides and suitably secured thereto, as by an adhesive not affected by the liquid to be filtered. Such a provision is useful where it is desired to form the sheets in advance and store or ship them in such form, but the flat sheets are conveniently stored and shipped, and are formed as used, with very little inconvenience to the user.

With the sheets in position in the trays, the oil or similar liquid, in its impure condition, is poured into the trays, where, to escape through the spouts, it is necessary for the liquid to pass through the filtering sheet under the low pressure due to the height of liquid in the tray. The flow takes place very slowly, appearing at the spouts generally as a mere dripping, occasionally increasing to a slight steady stream, depending somewhat on the flow of the filtered liquid along the bottom of the tray under the sheet, as the operation progresses. Under such circumstances as these, and by properly adjusting the inclination of the tray, as by the means illustrated, a practically steady, very slow filtration is effected, under very low pressure. Operating properly, trays one inch deep may require several days of time to discharge their full contents of pure liquid, leaving the impurities evenly spread over the surface of the sheet, but not embedded therein nor clogging the pores of the sheet. The sheet will be found to be impregnated with nothing more, practically, than the pure liquid held therein by capillarity. The vertical or upright parts of the sheet also filter liquid, which runs down the sides of the tray to join with that on the bottom and escape therewith. It is especially desirable to have the inwardly folded corner parts free as shown in Figs. 1 and 6; when these parts of the sheet are thus disposed, and not brought over or fastened to one of the adjacent sides as in Fig. 7, this inwardly folded corner part also filters with as much efficiency as the straight upfolded sides of the sheet. On account of the definiteness of formation of these inwardly folded corner parts, their full filtering area is utilized and the disruption of the fibers of the sheet is minimized, being practically negligible since the only distortion of the sheet occurs at the folds $a$ and the fold $b$, which are not abrupt and may be fully controlled in their formation in the preparation of the sheet for insertion into the tray. These advantages are directly due to the provision of the trays of rectangular formation and the use of the sheets folded to fit them, whereby the four corners are the only parts around the sides of the tray that must have the sheet bent or folded. If a round receptacle is used, the sheet must be crimped to turn the sides of the sheet up. This requires that the sheet must be distorted in an indefinite number of places; and when the places of distortion are so numerous they are not under the control of the operator who is preparing the sheet, and will be likely to have as many different directions as there are different places of distortion, and even with the folds or creases crossing over each other, so that the fibers of the paper or other filtering material are badly disrupted, so modifying the character of the sheet in the side regions that for the purposes of a high degree of filtration the apparatus fails to prove satisfactory. In fact, such sheets for circular receptacles, to be formed with any facility, must be drawn up by means of a punch and die in a machine; and even with the most skilful formation of the punch and die and the most careful manipulation of the machine, the operation will involve severe tearing strains on the fibers of the sheet, not only at the circular fold where the upturned sides join the bottom, but at every distortion around the upturned side due to the creasing or crimping. Furthermore, by using the square sheet of filtering material it is cut without waste from the larger sheets or rolls of material, whereas circular sheets, or other sheets other than rectangular, must involve waste in cutting as well as involving a more expensive operation generally to cut to the circular pattern instead of merely cutting along straight lines. Also, as above noted, circular sheets, to be formed up with any facility, require special machinery and expert manipulation, whereas the rectangular sheet combined with the rectangular tray according to my invention, may be formed up by anyone without any great special skill and the operation may be formed in any location without any special means. This permits the sheets to be transported flat to the place where they are to be used, whereas sheets that must be formed by special means and with special skill must generally be made in a factory and transported in their formed-up condition, in which they will occupy more space and in which they are more liable to be injured and their usefulness impaired, unless indeed they are carefully packed, which also involves extra labor and expense.

While the apparatus shown is especially suitable for filtering lubricants, the especially advantageous conditions under which the filtration may be carried on make it possible, with the proper kind of filtering paper, to remove the germs from water successfully and conveniently without great expense. This circumstance, together with the extreme simplicity and lightness of construction and the facility with which the rectangular flat sheets may be transported and prepared for use as required, makes my invention especially suitable for the use of travelers, prospectors, campers and for army use. A few of these trays and paper sheets will filter sufficient water for several persons, and may be quickly set up for operation on any occasion. Owing to the minimized disruption of the fiber of the filtering material, the passage of even the most minute impurities with the filtrate is prevented, so that a very high degree of filtration of water or other liquid is possible, under conditions which would be highly unfavorable with the use of other apparatus. This is especially significant in connection with the filtration of water for drinking purposes in traveling or camping in remote regions, where the unfiltered water may be dangerous, and where the facilities for preparing a complicated filtering apparatus are not present.

If it be desired to use some or all of the trays in series, securing double or higher degree of filtration, some trays may be allowed to discharge into others. Thus, the second and fourth trays from the top, in the example, might be withdrawn sufficiently to allow the first and third to discharge into them, respectively, securing double filtration.

What I claim as new and desire to secure by Letters Patent is:

1. In filtering apparatus, the combination with a rigid shallow tray provided with internal sheet-supporting means, adapted to space a sheet from the body of the tray while allowing liquid to pass freely in the intervening space, and with an aperture permitting free gravity-discharge of liquid from said space, of a primarily plane tray-lining filter sheet supported by said means and having all its marginal portions bent upwardly to cover and be supported by the side walls of the tray.

2. In filtering apparatus, the combination with a shallow rectangular tray having internal surface projections with intermediate channels leading to an aperture at the bottom of the tray, of a primarily plane filter sheet supported by said projections and having all its lateral marginal portions bent upwardly to cover the lateral walls of the tray, the surplus stock at the corners of the sheet being folded and out of contact with the adjacent portions of the sheet; whereby the filtering capacity of the sheet is substantially uniform throughout.

3. In filtering apparatus, a series of trays of minimized height and augmented bottom area, each with an outlet orifice through its bottom near one side thereof, a spout on each tray, attached to the bottom of the tray, with part of the area of the spout under said outlet orifice, each spout having an outlet, filtering material supported in each tray and conforming substantially to the bottom and sides of the respective tray with the structure of said material intact, means forming liquid-conducting ways over the surface of each tray under the filtering material therein to the outlet of the tray, a stand, and means on said stand supporting said trays in vertical alinement, with their spouts in vertical alinement, so that each spout discharges into the spout below it, and means for receiving liquid from the lowermost spout.

4. In filtering apparatus, a series of trays of minimized height and augmented bottom area, each with an outlet orifice through its bottom near one side thereof, a spout on each tray, attached to the bottom of the tray, with part of the area of the spout under said outlet orifice, each spout having an outlet, filtering material supported in each tray and conforming substantially to the bottom and sides of the respective tray with the structure of said material intact, means forming liquid-conducting ways over the surface of each tray under the filtering material therein to the outlet of the tray, a stand, means on said stand supporting said trays with their spouts in vertical alinement, so that each spout discharges into the spout below it, means for receiving liquid from the lowermost spout, and means for inclining and changing the inclination of said stand to control the flow to the tray outlets.

5. In a filtering apparatus, a wide and shallow rectangular tray with an outlet from its bottom, spacing means in the interior of the tray, and a filtering sheet supported in said tray with superfluous parts of it near the corners of the tray disposed of by folding, whereby the fibers of the sheet are not removed or materially disturbed, and whereby the sheets may contain liquid to be filtered through it without the filtering structure of the material impaired, thereby affording substantially the full normal resistance of the filtering sheet against the passage of impurities with the filtrate.

In testimony whereof I have hereunto signed my name in the presence of two subscribing witnesses.

KARL KIEFER.

Witnesses:
 CLARENCE PERDEW,
 CATHERINE DORAN.

Copies of this patent may be obtained for five cents each, by addressing the "Commissioner of Patents, Washington, D. C."